US012633692B2

(12) United States Patent
Cheng

(10) Patent No.: US 12,633,692 B2
(45) Date of Patent: May 19, 2026

(54) DYNAMIC CONNECTOR FOR IMPACT RESISTANCE

(71) Applicant: Hand Held Products, Inc., Charlotte, NC (US)

(72) Inventor: Hongkun Cheng, Charlotte, NC (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 384 days.

(21) Appl. No.: 18/309,396

(22) Filed: Apr. 28, 2023

(65) Prior Publication Data

US 2023/0361507 A1 Nov. 9, 2023

(30) Foreign Application Priority Data

May 5, 2022 (CN) ......................... 202210480426.6

(51) Int. Cl.

| | |
|---|---|
| ***H01R 12/91*** | (2011.01) |
| ***H01R 12/57*** | (2011.01) |
| ***H01R 13/508*** | (2006.01) |
| ***H01R 13/516*** | (2006.01) |
| ***H01R 13/631*** | (2006.01) |
| *H01R 13/05* | (2006.01) |

(52) U.S. Cl.

CPC ............ *H01R 12/91* (2013.01); *H01R 12/57* (2013.01); *H01R 13/508* (2013.01); *H01R 13/516* (2013.01); *H01R 13/6315* (2013.01); *H01R 13/05* (2013.01)

(58) Field of Classification Search

CPC ............................ H01R 12/91; H01R 13/6315

USPC .................................................. 439/248, 122

See application file for complete search history.

(56) References Cited

U.S. PATENT DOCUMENTS 4,909,748 A * 3/1990 Kozono ............. H01R 13/6315 439/247
5,392,371 A * 2/1995 Morlion ............... G02B 6/3817 439/248
5,516,303 A * 5/1996 Yohn .................. H01R 13/6315 439/248

(Continued)

FOREIGN PATENT DOCUMENTS

CN 206947399 U 1/2018
WO 2021/108706 A1 6/2021

OTHER PUBLICATIONS

EP Office Action Mailed on Jun. 3, 2025 for EP Application No. 23170918, 12 page(s).

(Continued)

*Primary Examiner* — Marcus E Harcum
(74) *Attorney, Agent, or Firm* — Alston & Bird LLP

(57) ABSTRACT

An example dynamic connector as an absorber of impacts, is provided. An example dynamic connector includes a housing configured to engage a substrate. In addition, the example dynamic connector includes a pluggable connector having at least one electrical conductor. In an instance in which the housing is engaged with the substrate, a dynamic connector may allow the pluggable connector to move relative to the substrate while maintaining electrical communication between the at least one electrical conductor and the substrate. In another example, a circuit board assembly including a dynamic connector for impact resistance is provided. Further, an example electronic device including a dynamic connector as an absorber for impacts is provided.

14 Claims, 6 Drawing Sheets

(56) References Cited

U.S. PATENT DOCUMENTS

| | | | | |
|---|---|---|---|---|
| 6,254,438 | B1 | 7/2001 | Gaunt | |
| 6,347,950 | B1 * | 2/2002 | Yokoyama | H01R 13/6315 439/62 |
| 6,422,885 | B2 * | 7/2002 | Kain | H01R 13/6315 439/247 |
| 8,435,048 | B2 | 5/2013 | Fahllund et al. | |
| 8,721,356 | B2 * | 5/2014 | Webb | H01R 13/58 439/248 |
| 10,199,761 | B1 * | 2/2019 | Kuo | H01R 12/716 |
| 11,949,195 | B2 * | 4/2024 | Chen | H01R 13/6315 |
| 2011/0250773 | A1 * | 10/2011 | Hamner | H01R 12/724 439/248 |
| 2011/0294326 | A1 * | 12/2011 | Tanaka | H01R 13/6315 439/248 |
| 2016/0204536 | A1 * | 7/2016 | Doi | H01R 12/716 439/248 |
| 2020/0083643 | A1 | 3/2020 | Hashiguchi | |
| 2020/0127405 | A1 | 4/2020 | Shioda et al. | |
| 2021/0104840 | A1 | 4/2021 | Doi | |
| 2021/0296725 | A1 | 9/2021 | Lee et al. | |

OTHER PUBLICATIONS

European search report Mailed on Oct. 4, 2023 for EP Application No. 23170918, 12 page(s).

* cited by examiner

DYNAMIC CONNECTOR FOR IMPACT RESISTANCE

CROSS-REFERENCE TO RELATED APPLICATIONS

This application claims priority pursuant to 35 U.S.C. 119(a) to Chinese Application No. 202210480426.6, filed May 5, 2022, which application is incorporated herein by reference in its entirety.

TECHNOLOGICAL FIELD

Embodiments of the present disclosure relate generally to an electrical connector having improved reliability. The electrical connector may be capable of withstanding high impact and may be resilient to various loads by allowing movement while connected to prevent damage to the connector pins.

BACKGROUND

Applicant has identified many technical challenges and difficulties associated with electrical connections experiencing various impacts and loads. Through applied effort, ingenuity, and innovation, Applicant has solved problems related to these electrical connectors by developing solutions embodied in the present disclosure, which are described in detail below.

BRIEF SUMMARY

Various embodiments are directed to an example dynamic connector as an absorber of high impacts as well as an example circuit board assembly comprising a dynamic connector and an example electronic device comprising a dynamic connector.

In accordance with some embodiments of the present disclosure, an example dynamic connector is provided. In some embodiments, the example dynamic connector comprises a housing configured to engage a substrate. In some embodiments, the example dynamic connector further comprises a pluggable connector comprising at least one electrical conductor, wherein the pluggable connector is movable relative to the housing. In some embodiments, in an instance in which the housing is engaged with the substrate, the pluggable connector is configured to move relative to the substrate while maintaining electrical communication between the at least one electrical conductor.

In some embodiments, the pluggable connector or the housing may further comprise one or more protrusions, and the other of the pluggable connector and the housing may further comprise one or more slots configured to receive a corresponding one of the one or more protrusions.

In some embodiments, the one or more protrusions may comprise a plurality of protrusions, wherein the one or more slots comprise a plurality of slots each configured to receive a corresponding one of the plurality of protrusions, and wherein the plurality of slots are oriented parallel to a common axis.

In some embodiments, the common axis may be configured to be parallel to a top surface of the substrate.

In some embodiments, the one or more protrusions may be spring-loaded.

In some embodiments, the pluggable connector may define a bottom side configured to be disposed adjacent the substrate, a top side opposite the bottom side, and a plurality of lateral sides between the top side and the bottom side, the connector assembly further comprising one or more housing support springs positioned between one or more of the plurality of lateral sides of the pluggable connector and the housing.

In some embodiments, the housing may define an opening having a cross-sectional area that is less than a cross-sectional area of the pluggable connector, and wherein the at least one electrical conductor is accessible to an exterior of the housing via the opening.

In some embodiments, the at least one electrical conductor may be configured to at least partially protrude from the opening to the exterior of the housing.

In some embodiments, the at least one electrical conductor may further comprise a first portion configured to engage and electrically communicate with an electrical device connector, and a second portion configured to engage the substrate.

In some embodiments, the first portion of the at least one electrical conductor may be a conducting pin configured to insert into a conducting socket of an electrical device connector.

In some embodiments, the first portion of the at least one electrical conductor may be a conducting socket configured to receive a conducting pin of an electrical device connector.

In some embodiments, the second portion of the at least one electrical conductor comprises a conductor contact spring configured to maintain electrical communication between the pluggable connector and the substrate while the pluggable connector moves relative to the housing.

In some embodiments, the conductor contact spring comprises a conductive protrusion that is integral with the second portion of the at least one electrical conductor and is configured to contact the substrate and maintain electrical contact with the substrate.

An example circuit board assembly comprising a dynamic connector is further included. In some embodiments, the example circuit board assembly comprises a substrate comprising a printed circuit board and a connector assembly. In some embodiments, the connector assembly may comprise a housing configured to engage the substrate and a pluggable connector. In some embodiments, the pluggable connector may comprise at least one electrical conductor, wherein the pluggable connector is movable relative to the housing. In some embodiments, wherein in an instance in which the housing is engaged with the substrate, the pluggable connector may be configured to move relative to the substrate while maintaining electrical communication between the at least one electrical conductor.

In some embodiments, the substrate may further comprise conductive contact pads configured to maintain electrical communication between the pluggable connector and the substrate while the pluggable connector moves relative to the housing.

In some embodiments, the pluggable connector may further comprise a plurality of electrical conductors, each electrical conductor of the plurality of electrical conductors having a first portion configured to engage and electrically communicate with an electrical device connector and a second portion configured to engage and electrically communicate with the conductive contact pads of the substrate.

In some embodiments, in an instance in which the housing is engaged with the substrate, the contact pads may be disposed within the housing.

In some embodiments, wherein the second portion of each electrical conductor of the plurality of electrical conductors comprises a conductor contact spring configured to maintain electrical communication between the pluggable connector and an associated conductive contact pad while the pluggable connector moves relative to the housing, and wherein the pluggable connector defines a bottom side configured to be disposed adjacent the substrate, a top side opposite the bottom side, and a plurality of lateral sides between the top side and the bottom side, the connector assembly may further comprise two or more housing support springs positioned between two or more of the plurality of lateral sides of the pluggable connector and the housing.

An example electronic device comprising a dynamic connector is further included. In some embodiments, the example electronic device may comprise a substrate, and a connector assembly. In some embodiments, the connector assembly may comprise a substrate and a connector assembly. In some embodiments, the connector assembly may comprise a housing configured to engage the substrate and a pluggable connector. In some embodiments, the pluggable connector comprises at least one electrical conductor wherein the pluggable connector is movable relative to the housing, and wherein in an instance in which the housing is engaged with the substrate, the pluggable connector may be configured to move relative to the substrate while maintaining electrical communication between the at least one electrical conductor.

In some embodiments, the substrate may further comprise conductive contact pads configured to maintain electrical communication between the pluggable connector and the substrate while the pluggable connector moves relative to the housing. In some embodiments, the at least one electrical conductor further comprises a first portion configured to engage and electrically communicate with an electrical device connector, and a second portion configured to engage the substrate. In some embodiments, the second portion of each electrical conductor of the at least one electrical conductors may further comprise a conductor contact spring configured to maintain electrical communication between the pluggable connector and an associated conductive contact pad while the pluggable connector moves relative to the housing. In some embodiments, the pluggable connector may define a bottom side configured to be disposed adjacent the substrate, a top side opposite the bottom side, and a plurality of lateral sides between the top side and the bottom side, the connector assembly further comprising two or more housing support springs positioned between two or more of the plurality of lateral sides of the pluggable connector and the housing.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present invention.

DETAILED DESCRIPTION

Figure 1:
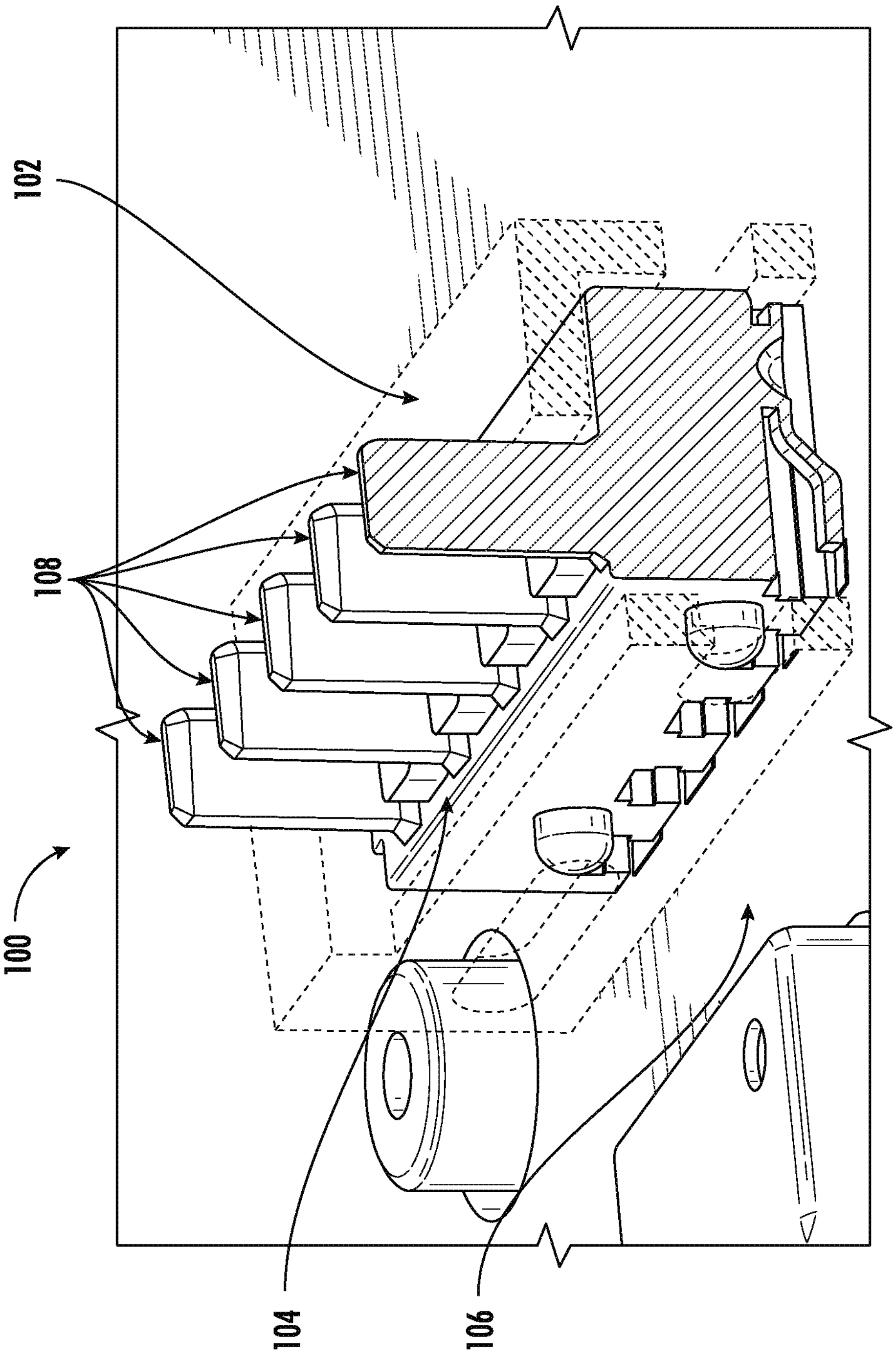
FIG. 1 illustrates a cross-sectional view of an example connector assembly connected to a printed circuit board (PCB) in accordance with an example embodiment of the present disclosure.

Example embodiments will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with designing electrical connectors to remain durable in an environment that may experience high impacts, loads, torques, and the like, including longer-duration persistent forces and short-duration shock forces (collectively referred to as "impact" herein) between two opposing sides of a connection (e.g., between a connector mount on a PCB and a cable and plug attached to the connector, between a battery and a PCB-mounted battery connector, etc.). These impacts may be increasingly large in instances where the connector forms some or all of a structural connection between the two opposing sides (e.g., a battery connector supporting a portion of a battery). As understood by those of skill in the field to which the present disclosure pertains, many different types of devices may experience potentially damaging impacts at their connectors, including but not limited to battery connectors for mobile device batteries. The connectors of the present disclosure may be capable of withstanding high impacts to pass increased product testing requirements, such as tumble tests and drop tests, and to dependably operate in a rugged and/or mobile environment. Standard electronic connectors are often soldered or otherwise rigidly connected to a device or PCB (e.g., via SMT constant soldering). High impacts in these connections may exert large forces on the connectors and/or PCBs which may break attachment pins or soldered connections. Moreover, rigid connections may breakdown more quickly even under normal impacts such that the service life of any electronic device may be reduced by connector failure.

The various embodiments of dynamic connectors disclosed herein utilize various features to make electronic connectors in environments that may experience impacts, including but not limited to a connector used in rugged and/or mobile environments, more immune to damage. For example, in some embodiments, a dynamic connector may include a slotted housing configured to receive protrusions from one or more sides of the electrical connector, such that a pluggable connector body of the electrical connector is movable relative to a substrate, such as the PCB, while being at least partially supported and/or constrained by the housing relative to the substrate. In some embodiments, the electrical conductors of the dynamic connector may be attached to and movable with the pluggable connector body. The conductors of the pluggable connector and/or the protrusions associated with the housing may absorb at least some impact in one or more loading directions. In addition, the connector may utilize one or more springs or other flexible material between the housing and the pluggable connector body on the one or more sides of the pluggable connector body, allowing the pluggable connector to move in a lateral direction with respect to the substrate. The ability for the pluggable connector body to move relative to the substrate and housing while maintaining continuous electrical connection may facilitate absorption of at least some of the impact from high impact events and may prevent the connecting device from experiencing the same damage as an electrical conductor that is rigidly fixed to a substrate. In some embodiments, the various impact absorbing structures discussed herein, which urge the pluggable connector body towards a neutral position relative to the housing, may facilitate at least some of the impact absorption.

In some embodiments, the dynamic connector may include conductive, flexible protrusions utilized to make an electrical connection with the mounting surface of the substrate and/or with a corresponding connector on an electrically connected electrical device. For example, a PCB may provide conductive pads that provide an electrical connection to circuitry disposed on the board. The conductive pads may be larger than a corresponding contacting surface area of the electrical conductor of the dynamic connector. The dynamic connector may utilize flexible, conductive protrusions, such as leaf springs, that are in contact with the conductive pads but not rigidly affixed to the conductive pads to maintain contact with the conductive pads while allowing relative movement therebetween. This allows the pluggable connector body of the dynamic connector to move around during high impacts but still maintain connectivity with the coupled circuitry. For example, various embodiments may enable the conductors and pluggable connector body to move both laterally parallel to the surface of the substrate via the non-rigid connection and comparably larger pad size of the substrate and vertically perpendicular to the surface of the substrate via the flexible protrusions. As a result of the herein described embodiments and examples, the dynamic connector may provide reliable electronic connections to devices susceptible to high impacts, such as but not limited to an electrical connector associated with a PCB that connects to a battery.

FIG. 1 illustrates a cross-sectional view of an example connector assembly 100 connected to a substrate (e.g., PCB 106) according to various embodiments of the present disclosure. The connector assembly 100 is configured to, in some examples, provide a connection capable of dynamically absorbing impacts while maintaining electrical communication between electrical conductors (with an electrical component disposed on a PCB 106. Providing a connection in accordance with various embodiments of the present disclosure may protect a pluggable connector 104 and a connecting electric device (e.g., a battery as part of a larger electrical device or a separate computing device connected via the connector) from high impacts. It will be appreciated that the illustrated connector assembly 100 and various depicted embodiments herein are provided as example embodiments and should not be construed to narrow the scope or spirit of the disclosure in any way.

Figure 2:
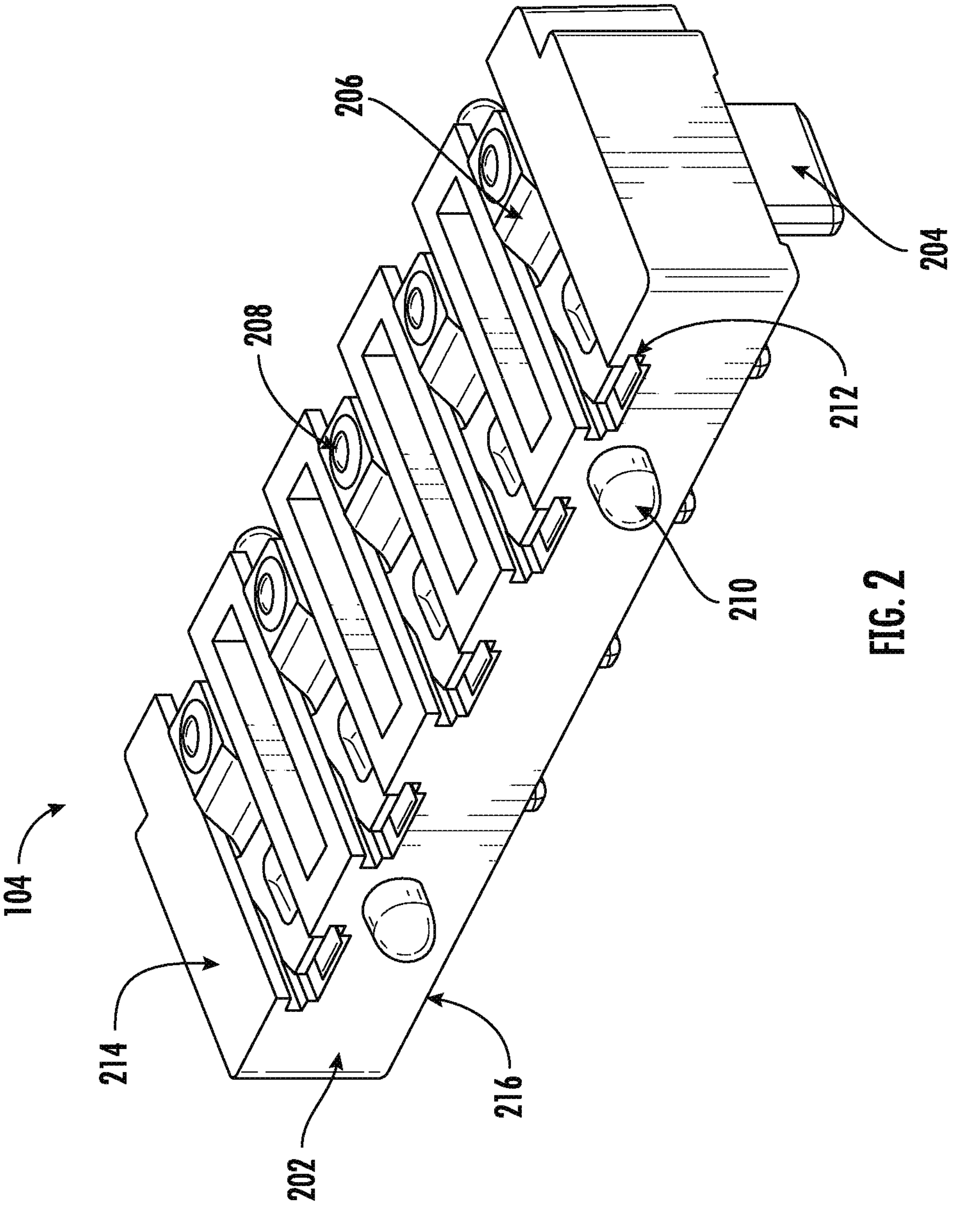
FIG. 2 illustrates a perspective view of the side of a pluggable connector of a connector assembly in accordance with an example embodiment of the present disclosure.

The depicted connector assembly 100 of FIG. 1 includes a pluggable connector 104 with one or more electrical conductors 108 (e.g., which may include a conducting pin 204 and/or a contact spring 206 as labeled in FIG. 2) configured to establish electrical communication between an underlying substrate (e.g. PCB 106) and an electronic device connecting. The electrical conductors 108 may be disposed on or at least partially within the pluggable connector 104. In addition, FIG. 1 depicts a housing 102 of the connector assembly 100 substantially surrounding the pluggable connector 104 while still allowing access to the electrical conductors of the pluggable connector 104. FIG. 1 further depicts the housing 102 connected to the underlying PCB 106 and suspending the pluggable connector 104 above the surface of the PCB 106 allowing the pluggable connector 104 to move relative to the underlying substrate (e.g., PCB 106).

In some embodiments, the housing 102 may comprise any structure capable of supporting and constraining motion of a pluggable connector 104 while allowing the pluggable connector 104 to still move relative to the PCB 106. In the depicted embodiment of FIG. 1, the housing 102 includes four lateral sides, a top side, and a bottom side surrounding the exterior of the pluggable connector 104. In some embodiments, the housing 102 may securely fasten to the underlying substrate (e.g., PCB 106) by, for example, screw, pin, fastener, adhesive, solder, through manufacture, or by any other method of securely connecting the housing 102 to the underlying substrate. In some embodiments, the housing 102 may partly or entirely comprise any material or materials capable of supporting the pluggable connector 104 and capable of attachment to the underlying substrate. In some embodiments, the housing 102 may be formed of a single structure, while in other embodiments, a housing 102 may be formed of multiple structures providing equivalent functionality. The housing 102 may comprise plastic (e.g., polyformaldehyde) or any other material capable of facilitating use of and constraining the motion of a pluggable connector 104. In some embodiments, the PCB 106 may comprise some or all of the housing 102 structure, while in some embodiments, some or all of the components of the housing 102 may comprise a separate structure capable of attachment to the PCB 106. In some embodiments, the housing 102 may include an adhesive layer, cushion layer, or other dissimilar material between the upper portions of the housing and the PCB.

As depicted in FIG. 1, a pluggable connector 104 may comprise any structure capable of receiving one or more electrical conductors to facilitate electrical communication between the underlying substrate (e.g. PCB 106) and a connecting electronic device while moving relative to the PCB 106. As depicted a pluggable connector 104 may comprise electrical conductors 108 at least a portion of which may extend above the surface of the housing 102 and accessible through an opening (e.g. opening 306 labeled in FIG. 3) in the housing 102. In other embodiments, the pluggable connector 104 may provide conducting sockets or pads into which or onto which the conductive prongs of a connecting electronic device may connect without departing from the scope of the present disclosure. The pluggable connector 104 may comprise a structure (e.g. connector body 202) comprised of an insulating material electrically separating the electrical conductors from one another and separating the electrical conductors from other components of the connector assembly 100. The pluggable connector 104 body may comprise plastic (e.g., LCP E6007) or any other material capable of providing electric insulation to the surrounding structures and sufficiently separating the individual electrical conductor.

As depicted in FIG. 1, the connector assembly 100 may further include a substrate, such as a PCB 106. The substrate may include any structure capable of routing electronic signals to which an electrical connector may be rigidly attached, including a PCB comprising a combination of conductive channels and insulating materials. In some embodiments, the PCB 106 may comprise circuitry configured to perform operations based on received electronic signals. As depicted in FIG. 1, a PCB 106 may comprise contact points configured to receive electronic signals and route received electronic signals to internal circuitry or other devices disposed on or in electronic communication with the PCB 106. In the depicted embodiment of FIG. 1, the PCB 106 comprises conductive pads (e.g., pads 312 labeled in FIG. 3) capable of receiving electronic communication with a connecting electronic device through the conductor(s) of the pluggable connector 104.

FIG. 2 illustrates a perspective view of a pluggable connector 104 according to an example embodiment. In the view of FIG. 2, the pluggable connector 104 is upside down relative to the view of FIG. 1. As depicted in FIG. 2, the pluggable connector 104 may comprise a connector body 202 configured to receive one or more electrical conductors 108. The depicted pluggable connector 104 comprising conductive channels extending from its top side to its bottom side to allow a corresponding electrical conductor to extend through each channel. The conductors 108 may thereby transfer electrical energy (e.g., battery charge, signals, etc.) from the first portion of the electrical conductor (e.g. conducting pin 204) to the second portion of the electrical conductor (e.g. contact spring 206) and vice versa. In some embodiments, the pluggable connector 104 may further comprise one or more protrusions (e.g. connector protrusions 210) configured to engage the body of the housing 102 (shown in FIG. 1) to guide and/or support the pluggable connector 104. For example, the protrusions 210 may engage with corresponding lateral slots 304 (shown in FIG. 3) in the housing as shown and described with respect to FIG. 4.

The connector body 202 may comprise any structure capable of receiving one or more electrical conductors and supporting the conductors while allowing electrical signals to pass from an electrical device to the substrate via the conductors. In the depicted embodiment, the connector body 202 provides conductive channels that receive the conductors while allowing engagement of the first portion of the electrical conductor (e.g., conducting pin 204) and the second portion of the electrical conductor (e.g., contact spring 206) with the respective receiving contacts of another electrical device (not shown) and the substrate. The connector body 202 may be formed of an insulating material such as plastic and/or any other insulating material capable of insulating the electric flow to the separate electrical conductors and surrounding structures. In some embodiments, the connector body 202 may comprise one or more openings which provide a channel from the side of the connector body 202 adjacent the PCB 106 (214) through the connector body 202 and out the side of the connector body 202 opposite the PCB 106 (216), facilitating the receipt of an electrical conductor that passes through the connector body 202. In some embodiments, the electrical conductors 108 may comprise multiple components connected directly or indirectly to the connector body 102 so long as electrical energy is able to travel from/to the pin or other connecting portion 204 (e.g., the portion that receives the energy from the connected device, such as the battery electrical contacts) to/from the substrate while at least a portion of the conductor(s) move with the body.

FIG. 2 further depicts a plurality of electrical conductors 108 having a first portion (e.g., conducting pins 204) and a second portion (e.g., contact springs 206). An electrical conductor may comprise any structure capable of conducting an electric current and facilitating electrical communication from the first portion of the electrical conductor (e.g., conducting pin 204 or a different structure of contact, such as a pad or socket) to the substrate. In some embodiments, the substrate is connected to a second portion of the electrical conductor (e.g., contact spring 206) which allows the pluggable connector 104 to move relative to the PCB 106 while maintaining an electrical contact with one or more corresponding pads on the PCB. In some embodiments, the first portion (e.g., conducting pin 204) and the second portion (e.g., contact spring 206) of the electrical conductor may be a single piece that passes through the connector body 202 and contacts the PCB 106 on the side of the connector body 202 adjacent the PCB 106 (214) and the connecting device on the side of the connector body 202 opposite the PCB 106 (216). In some embodiments, the first portion (e.g., conducting pin 204) and the second portion (e.g., contact spring 206) of the electrical conductor may comprise separate pieces that separately connect to each other either directly or indirectly (e.g., via one or more intermediate conductive elements). In some embodiments, the conducting pin 204 may be connected to the connector body through a manufacturing process, for example, insert/over molding. In some embodiments, the contact spring 206 may slide into the pluggable connector 104 via a rail slot, for example, a locking channel 212 and snap undercut. In some embodiments, the contact spring 206 may further comprise a conductive protrusion 208 configured to provide electrical contact with the adjacent substrate (e.g., PCB 106). The protrusion 208 may be rounded to allow it to slide smoothly along the pad on the substrate. The contact spring 206 may allow continued electric communication while the pluggable connector 104 moves vertically and/or laterally in relation to the underlying PCB 106. In some embodiments, the connector body 202 may comprise a locking channel 212 configured to receive a second portion of the electrical conductor (e.g., contact spring 206) such that the second portion of the electrical conductor locks into the connector body 202.

The contact spring 206 may provide flexibility in the second portion of the electrical conductor while contacting the underlying substrate conductive contact pad 312. This may allow a pluggable connector 104 to maintain electrical communication with the substrate (e.g., PCB 106) while the pluggable connector 104 moves relative to the housing 102 and underlying substrate. The contact spring 206 may allow motion of the pluggable connector 104 relative to the substrate in both directions parallel to the surface of the substrate (e.g., laterally) and in directions perpendicular to the surface of the substrate (e.g., vertically). The contact spring 206 may further apply force against the surface of the substrate conductive contact pad 312, remaining in constant compression and helping to facilitate consistent electrical communication with the substrate while the pluggable connector 104 moves. In some embodiments, a second portion of the electrical conductor 108 embodied as a contact spring 206 (including a pad or other contact element mounted to the bottom of a spring) may increase the durability of the electrical conductor in an environment that may experience high impacts.

The conductive protrusion 208 may allow a contact spring 206 to more easily move across the surface of a substrate conductive contact pad 312 while maintaining electrical communication. The conductive protrusion 208 may further provide a consistent point of contact with the underlying substrate providing consistent electrical communication between the substrate and the pluggable connector 104 while the pluggable connector 104 moves in relation to the substrate.

FIG. 2 further depicts one or more protrusions (e.g. connector protrusions 210) extending from one or more sides of the connector body 202. In the depicted embodiment of FIG. 2, the connector protrusions 210 are shown as spring-loaded, rounded protrusions extending from the connector body 202 and capable of coupling with a cavity or opening in the housing 102 (e.g., a housing guide slot 304 shown in FIG. 3). In some embodiments, the housing 102 may comprise the one or more protrusions and the pluggable connector 104 may comprise openings or slots configured to couple with the one or more protrusions.

Figure 4:
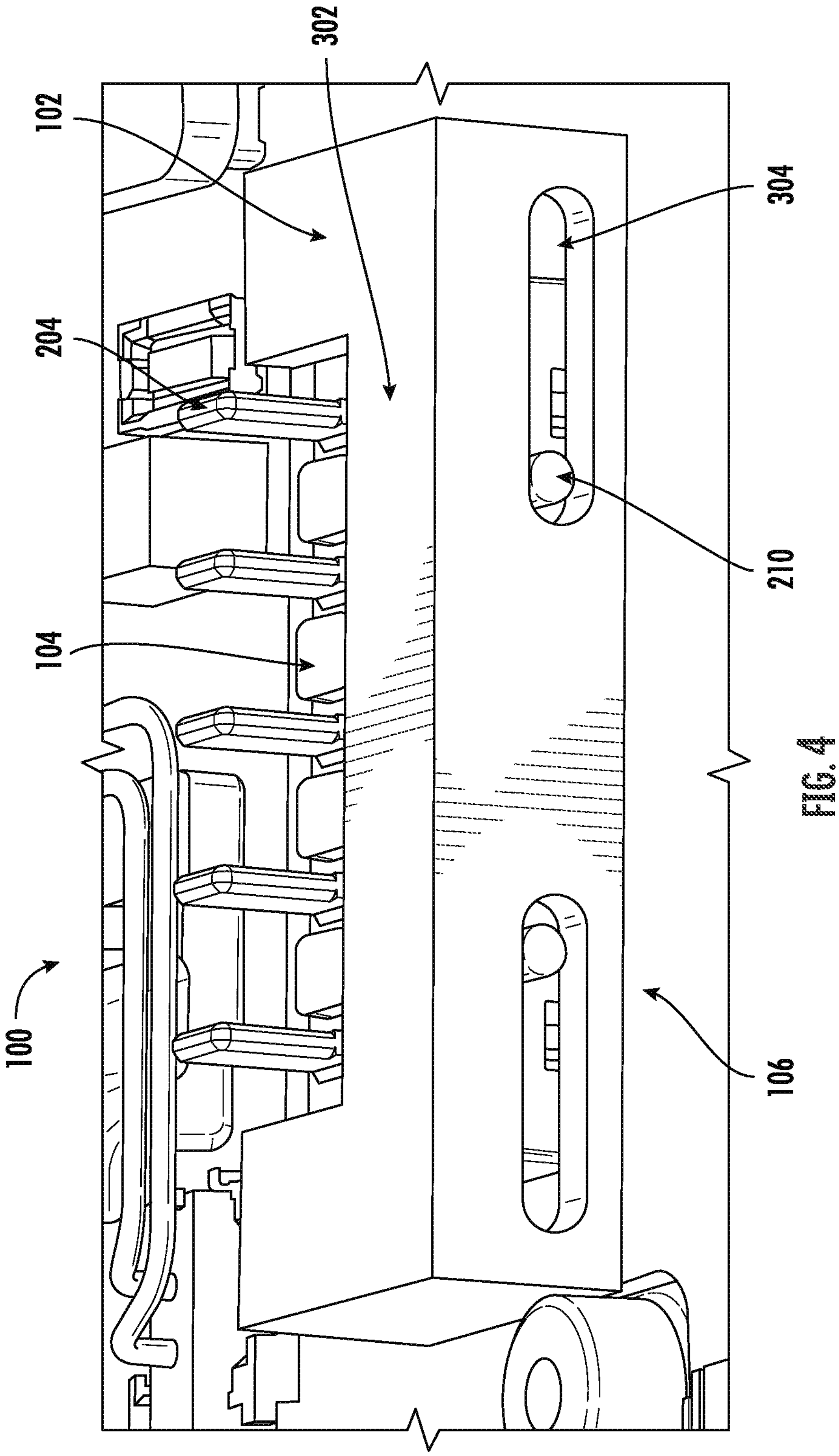
FIG. 4 illustrates a perspective view of an example connector assembly connected to a PCB in accordance with an example embodiment of the present disclosure.

In some embodiments, the connector protrusion 210 may comprise a rounded feature protruding from a surface as shown in FIG. 2. In other embodiments, the connector protrusion 210 may comprise any structure or feature protruding from the surface of either the pluggable connector 104 and/or the housing 102 and capable of insertion into a guide opening, channel, slot, cavity, or similar structure in the opposite of the pluggable connector 104 and/or the housing 102. For example, a connector protrusion 210 may comprise a pin, a peg, a screw, a rounded protrusion, and/or any other feature protruding from a surface and capable of supporting the pluggable connector 104. In some embodiments, connector protrusions 210 may be formed as part of a single integral body with the connector body 202 or the housing 102. In some embodiments, the connector protrusions 210 may comprise pieces separate from the connector body 202 or the housing 102 and may be attached to the connector body 202 or the housing 102. In some embodiments, the connector protrusions 210 may be formed of the same material as the connector body 202 or the housing 102, while in some embodiments, the connector protrusions 210 may be formed of a separate material, for example, a plastic, rubber, metal, and/or any other material capable of coupling with a corresponding opening or slot and allowing the pluggable connector 104 to freely move within the opening or slot relative to the housing 102. In some embodiments, a connector assembly 100 may comprise a plurality of connector protrusions 210, for example four, as shown in the embodiment of FIG. 4. In some embodiments, a connector body 202 or housing 102 may comprise a single connector protrusion 210. In some embodiments, all connector protrusions 210 may connect to the connector body 202 or the housing 102 while in some embodiments, the connector assembly 100 may comprise a combination of connector protrusions 210 disposed on the connector body 202 and the housing 102. As shown in FIG. 2, the connector protrusions 210 may be positioned on one or both sides of the connector body 202 or housing 102, however, in some embodiments, the connector protrusions 210 may be positioned on one or both ends of the connector body 202 or housing 102, or in any combination of the connector body 202 or housing 102 sides and ends. In some embodiments, the connector protrusions 210 may be positioned in alignment with a common axis, for example, an axis parallel to the surface of the PCB 106, as shown in FIG. 2. In some embodiments, such as shown in FIG. 4, the corresponding slots 304 or other similar features may be aligned parallel to a common axis, and the slots 304 or other features may be disposed on a common plane or on separate planes. Aligning the slots 305 parallel to a common axis and the protrusions parallel to another common axis, such as two axes parallel to the surface of the PCB 106 allows the pluggable connector 104 to move relative to the surface of the PCB 106 while the protrusions 210 ride in the slots. In some embodiments, a connector protrusion 210 may be spring-loaded or otherwise retractable toward the body of the pluggable connector 104. A connector protrusion 210 that is spring-loaded or otherwise retractable may provide a means to easily pass the pluggable connector 104 into the enclosed space of the housing 102. The connector protrusions 210 may then be extended once, the connector protrusions 210 are in a position aligned to the corresponding housing guide slot 304.

Figure 3:
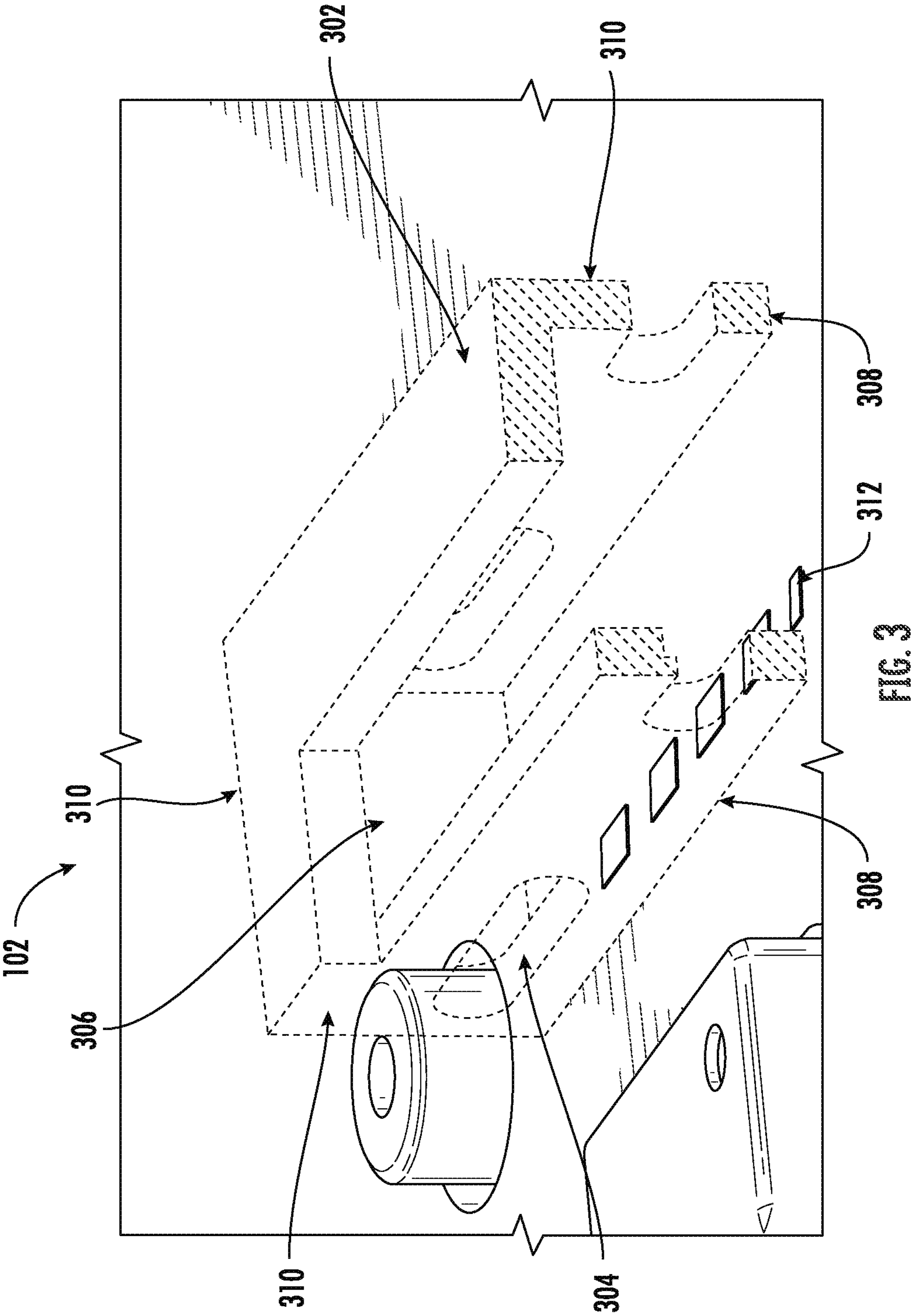
FIG. 3 illustrates a cross-sectional view of an example housing of a connector assembly and PCB in accordance with an example embodiment of the present disclosure.

FIG. 3 illustrates a cross-sectional view of an example housing 102 of a connector assembly 100. The depicted housing 102 may be formed as a rectangular prism with each of the four sides 310 substantially defined by corresponding walls; a housing bottom 308, which may be defined by the bottoms of the four side walls and an opening therebetween, may be configured to connect to an underlying substrate (e.g., PCB 106) and allow access to the underlying substrate (e.g., PCB 106); and a partially enclosed housing top 302 configured to allow access to a partially enclosed pluggable connector 104 (shown in FIG. 1).

FIG. 3 depicts a housing 102 having a housing bottom 308. A housing bottom 308 may be the portion of the housing 102 configured to be adjacent to the underlying substrate (e.g., PCB 106). In some embodiments, the housing bottom 308 may be entirely or partially open, allowing access to the underlying PCB 106 (e.g., access for the conductors to contact the pads 312 on the PCB). In some embodiments, the housing bottom 308 may comprise means to fasten the housing 102 to the PCB 106, for example screw holes, fastening mechanisms, adhesive tape layers, or the like. In some embodiments, the housing bottom 308 may be attached to the PCB 106 using a glue or other adhesive. In the various embodiments herein, the housing bottom 308 being attached or connected to the substrate may include both direct and indirect attachment.

FIG. 3 further depicts a plurality of housing sides 310. The housing 102 may comprise a plurality of housing sides 310 partially or fully enclosing the pluggable connector 104. In operation, the housing 102 and any additional alignment features (e.g., springs, protrusions, slots, etc.) may constrain the movement of the pluggable connector 104 so that the conductors do not disconnect from the pads 312 on the substrate. In some embodiments, the housing 102 may comprise connected sides which may form a single body. In some embodiments, the housing 102 may comprise multiple sides connected or attached to form a housing 102. In some embodiments, a housing side 310 may comprise one or more openings in the housing 102 (e.g., housing guide slot(s) 304). The housing guide slot(s) 304 may be any opening or cavity capable of receiving a corresponding protrusion (e.g., a connector protrusion 210) and providing a slot in which the connector protrusion 210 may move relative to the housing 102 and underlying PCB 106. In some embodiments, the housing guide slot 304 may comprise an additional material or structure facilitating movement of a connector protrusion 210 within the housing guide slot 304. In some embodiments, a plurality of housing guide slots 304 may be positioned in alignment with a common axis, for example, each slot may be parallel to an axis that is parallel to the surface of the PCB 106, as shown in FIG. 3. The protrusions 210 (shown in FIG. 2) may likewise extend into the respective slots and move along the axes of the slots. Positioning the housing guide slots 304 and moving the corresponding connector protrusions 210 along a common axis, such as an axis parallel to the surface of the PCB 106 allows the pluggable connector 104 to move relative to the surface of the PCB 106 while still maintaining electrical communication with the underlying PCB 106. In some embodiments, one or more housing sides 310 may comprise one or more protrusions similar to the connector protrusion 210 depicted in FIG. 2 protruding toward the pluggable connector 104 and capable of coupling with a guide slot disposed on the pluggable connector 104. In some embodiments, the primary movement or only movement may be in a lateral direction (as shown by the arrow in FIG. 6). In some embodiments, the protrusions 210 may be longer than the distance between the pluggable connector 104 and the adjacent inner surface of the housing 102 such that the protrusions can allow movement into and out of the slots (e.g., movement perpendicular to the axis noted above) without the pluggable connector 104 being released entirely. Similarly, in some embodiments, the top-to-bottom clearance between the upper and lower edges of the slots 304 and respective upper and lower surfaces of the protrusions 210 may be less than the travel distance of the second portion 206 of the conductors to maintain electrical contact. In the various embodiments disclosed herein, any combination of the identified features (or lack thereof) may serve to constrain the movement of the pluggable connector 104 (e.g., the protrusions may not reach the upper and/or lower edges of the slots depending on the point at which the pluggable connector 104 hits the top wall of the housing). In various embodiments, any of the depicted structural and/or electrical features may be used together or in any sub-combination so long as the connector as a whole is capable of transferring an electrical current to/from an electrical device from/to the substrate.

FIG. 3 further depicts a housing top 302 of the housing, which may at least partially define the opening 306 in some embodiments. As depicted in FIG. 3, a housing top 302 may partially enclose the pluggable connector 104 while still allowing access to the conducting pins 204 or conducting sockets of the pluggable connector 104 depending on the connecting structure used. In some embodiments, the housing top 302 may define a housing connector opening 306 positioned such that a connector to an external device may access the pluggable connector 104. In some embodiments the housing connector opening 306 defined by the partial housing top 302 may have a smaller cross-sectional area than the top surface of the pluggable connector 104 (216). Having a cross-sectional area smaller than the top surface of the pluggable connector 104 (216) may work to contain the pluggable connector 104 within the boundaries of the housing 102 while still allowing movement of and access to the electrical conductors 108. In some embodiments, the housing top 302 may be entirely open allowing full access to the encompassed pluggable connector 104. As shown in FIG. 4, in some embodiments having conductor pins 204 that extend from the pluggable connector 104, the pins 204 may extend out of the housing.

FIG. 3 further depicts a plurality of substrate conductive contact pads 312 configured to align with and electrically connect with the respective conductors 108 (shown in FIGS. 1-2). The substrate conductive contact pad 312 may comprise any conductive material providing an electrical contact point capable of facilitating electrical communication between the pluggable connector 104 and the substrate (e.g., PCB 106) and maintaining electrical communication while the pluggable connector 104 moves relative to the housing 102 and PCB 106. The PCB 106 may comprise corresponding electrical connections (e.g., copper traces) to carry the electrical current at each pad 312 to and from the proper PCB circuitry as would be appreciated by a person skilled in the art in light of the present disclosure.

In some embodiments, the substrate conductive pads 312 may be disposed within the housing 102 as shown in FIG. 3. In some embodiments, the substrate conductive contact pads 312 may provide a surface large enough to correlate with the range of motion allowed to the pluggable connector 104 (and consequently to the conductors 108) by the housing (e.g., via the various springs, housing guide slots, and/or protrusions, etc.) while still maintaining a separate substrate conductive contact pad 312 for each of the corresponding electrical conductors 108 connected to the pluggable connector 104. In some embodiments, a substrate conductive contact pad 312 may be rectangular in shape as depicted in FIG. 3, while in some embodiments, the substrate conductive contact pads 312 may be any shape to facilitate electrical communication while the pluggable connector 104 moves relative to the housing 102 and still maintains separation of the individual substrate conductive contact pads 312. A substrate conductive contact pad 312 may comprise any conductive or semi-conductive material capable of maintaining electrical communication between the PCB 106 and the electrical conductors disposed on the pluggable connector 104, for example, copper (e.g., phosphor bronze), gold, aluminum, iron, silver, and/or other materials known by a person having ordinary skill in the art.

FIG. 4 illustrates a perspective view of an example connector assembly 100. As depicted, FIG. 4 illustrates a housing 102 connected to an underlying PCB 106, substantially enclosing a pluggable connector 104 and having a plurality of housing guide slots 304 corresponding to a plurality of connector protrusions 210 disposed on a side of the pluggable connector 104. In addition, the housing 102 comprises a housing top 302 partially enclosing the pluggable connector 104 and defining a housing connector opening 306 allowing access to the enclosed pluggable connector 104 and the electrical conductors (e.g. conducting pins 204) of the pluggable connector 104. In some embodiments, an electrical device (e.g., a battery, a plug for another electrical device, etc.) may comprise a corresponding connector having, for example, sockets corresponding to the conducting pins 204 of the pluggable connector. Attaching the corresponding connector to the pluggable connector 104 of the connector assembly 100 will allow such an electronic device to establish electrical communication with the underlying substrate (e.g., PCB 106). In the depicted embodiment, the connector body 202 is suspended above the surface of the PCB 106 allowing the pluggable connector 104 to move in relation to the PCB 106, in some instances with at least three translational degrees of freedom. Allowing such movement may reduce the forces applied to the conducting pins 204 and the corresponding connector, limiting damage to the pluggable connector 104 and the corresponding connector in high impact environments both during connection and during use of the connected device(s). In some embodiments, the connecting electronic device with the corresponding connector may comprise a device external to the PCB 106 or even external to the electronic device comprising the connector assembly 100 entirely. In some embodiments, the connecting electronic device may comprise another electronic device disposed on the PCB 106 or part of the PCB 106 circuitry. In some embodiments, the connecting electronic device may be a battery for powering the PCB 106. In such embodiments, the battery may be externally connected or may be disposed within a battery compartment (e.g., under a closable battery door) of the overall electronic device to which the PCB 106 is associated.

Figure 5:
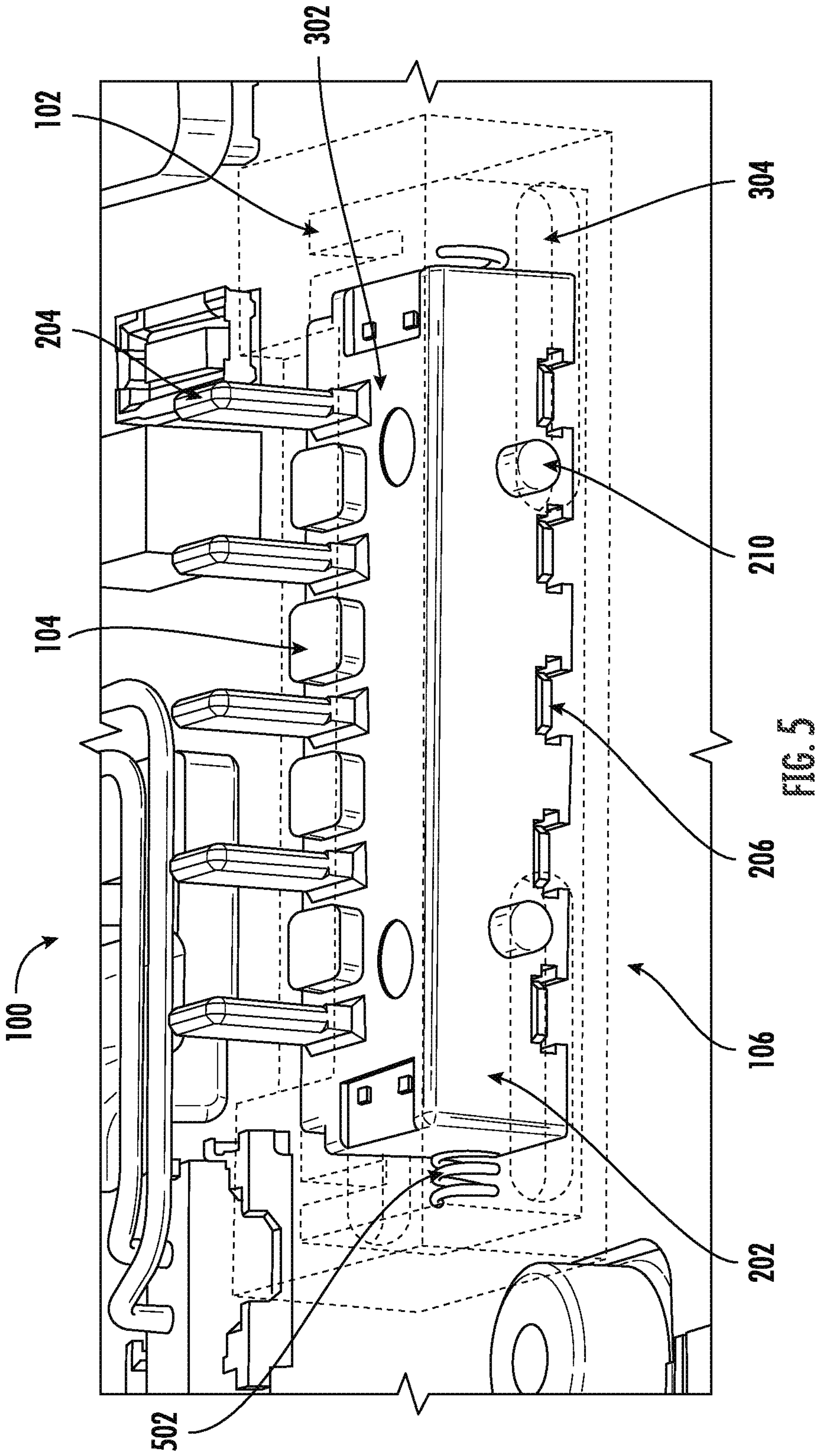
FIG. 5 illustrates a perspective view of an example connector assembly showing a transparent housing in accordance with an example embodiment of the present disclosure.

FIG. 5 illustrates a perspective view of an example connector assembly 100 as seen in FIG. 4, however, the depicted housing 102 is transparent, revealing the internal parts of the connector assembly 100 including a plurality of housing support springs 502.

As depicted in FIG. 5, the connector assembly 100 may comprise one or more housing support springs 502, positioned between one or more of the lateral sides of the pluggable connector 104 (e.g., housing side 310) and the housing 102. A housing support spring 502 may be any spring (e.g. tension or compression) or other flexible structure or material configured to control the motion of the pluggable connector 104 as the pluggable connector 104 moves relative to the housing 102 and the underlying substrate. In the depicted embodiment, both springs 502 are in tension when in the depicted neutral position (e.g., with the pluggable connector 104 centered laterally within the housing 102 and resting lightly on the second portion 206 of the conductors 108). When displaced from the neutral position, one spring 502 will compress while the other elongates to apply respective tension and compression to the pluggable connector 104. While the depicted embodiment illustrates a connector assembly 100 with two housing support springs 502, a connector assembly 100 may comprise one or more housing support springs 502 positioned between any surface of the pluggable connector 104 and the encompassing housing 102. In some embodiments, the housing support springs 502 may be positioned on the sides of the housing 102 and pluggable connector 104 adjacent the connector protrusions 210 and housing guide slots 304, controlling the movement in the direction of the housing guide slots 304. In various embodiments, springs may be positioned on any of the remaining sides and/or multiple springs may be used on the same side. Controlling the movement of the pluggable connector 104 using housing support springs 502 may further limit the force absorbed by the pluggable connector 104 electrical conductors and the corresponding connector, allowing the electrical device to maintain electrical communication with the substrate in an environment experiencing high impacts.

Figure 6:
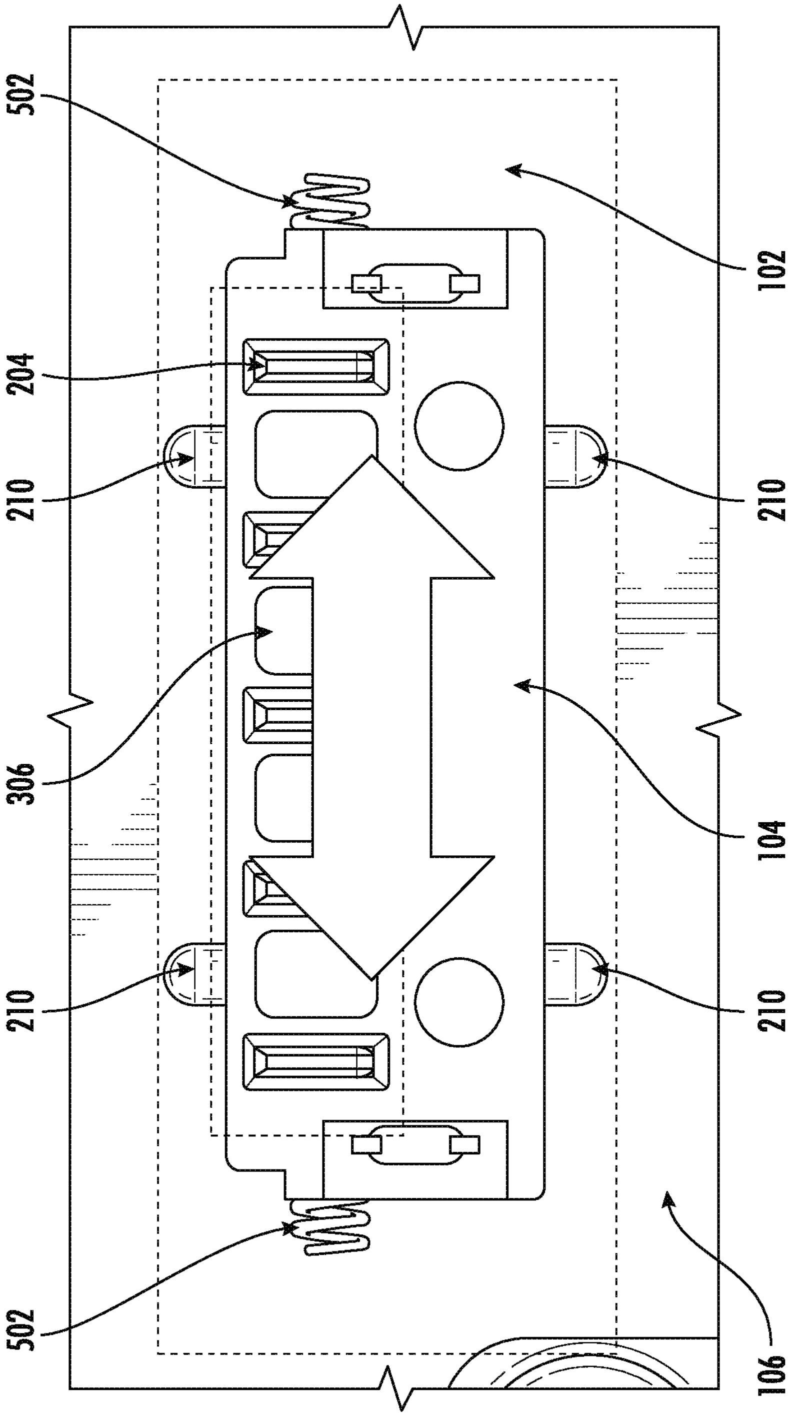
FIG. 6 illustrates a top view of an example connector assembly depicting movement in a lateral direction in accordance with an example embodiment of the present disclosure.

FIG. 6 depicts a top view of an example connector assembly 100 with an arrow illustrating one exemplary direction of motion of the pluggable connector 104 relative to the housing 102 and the underlying substrate (e.g., PCB 106). The example embodiment of FIG. 6 comprises four connector protrusions 210, two on each longitudinal side of the pluggable connector 104. The four connector protrusions 210 each fit into a corresponding housing guide slot 304 disposed in the housing 102, each oriented parallel to a common axis parallel to the surface of the substrate and allowing motion in the direction of the arrows. The example embodiment further comprises two housing support springs 502 disposed on opposite lateral sides of the pluggable connector 104 adjacent the connector protrusions 210 and positioned between the sides of the pluggable connector 104 and the housing 102, controlling the movement relative to the substrate in the direction of the arrows. The depicted embodiment shows the springs 502 axially aligned with the first portion 204 of the conductors 108 so that lateral force on the conductors may be directly applied to the springs without (or while minimizing) torque on the pluggable connector 104. The example embodiment of FIG. 6 further depicts a housing 102 having a housing top 302 defining a housing connector opening 306 with a cross-sectional area smaller than the cross-sectional area of the pluggable connector 104, holding the pluggable connector 104 in place while still allowing access to the electrical conductors (e.g. conducting pins 204) providing electrical communication to the underlying substrate.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to an electrical connector assembly, however, one skilled in the art may recognize that such principles may be applied to any connector required to maintain electrical communication while compensating for motion due to impacts. Alternative embodiments that result from combining, integrating, and/or omitting features of the embodiment(s) are also within the scope of the disclosure. Accordingly, the scope of protection is not limited by the description set out above.

Use of broader terms such as “comprises,” “includes,” and “having” should be understood to provide support for narrower terms such as “consisting of,” “consisting essentially of,” and “comprised substantially of” Use of the terms “optionally,” “may,” “might,” “possibly,” and the like with respect to any element of an embodiment means that the element is not required, or alternatively, the element is required, both alternatives being within the scope of the embodiment(s). Reference to directions (e.g., top, bottom, upper, lower, front, back, lateral, etc.) are intended to describe relative positions (e.g., a positioning relative to the substrate, relative to the other directions, etc.) and should not be interpreted as referring to absolute directions relative to the earth or other larger reference frames. Also, references to examples are merely provided for illustrative purposes, and are not intended to be exclusive.

What is claimed is:

1. A connector assembly comprising:

a housing configured to engage a substrate;

a pluggable connector comprising:

at least one electrical conductor configured to connect with a conductive contact pad of the substrate when the pluggable connector engages with the substrate;

wherein the pluggable connector is movable relative to the housing, wherein in an instance in which the housing is engaged with the substrate, the pluggable connector is configured to move relative to the substrate while maintaining electrical communication between the at least one electrical conductor and the substrate, and wherein one of the pluggable connector or the housing comprises one or more protrusions, and wherein the other of the pluggable connector and the housing comprises one or more slots configured to receive a corresponding one of the one or more protrusions.

2. The connector assembly of claim 1, wherein the one or more protrusions comprise a plurality of protrusions; wherein the one or more slots comprise a plurality of slots each configured to receive a corresponding one of the plurality of protrusions; and wherein the plurality of slots are oriented parallel to a common axis.

3. The connector assembly of claim 2, wherein the common axis is configured to be parallel to a top surface of the substrate.

4. The connector assembly of claim 1, wherein the one or more protrusions are spring-loaded.

5. The connector assembly of claim 1, wherein the pluggable connector defines a bottom side configured to be disposed adjacent the substrate, a top side opposite the bottom side, and a plurality of lateral sides between the top side and the bottom side, the connector assembly further comprising one or more housing support springs positioned between one or more of the plurality of lateral sides of the pluggable connector and the housing.

6. The connector assembly of claim 1, wherein the at least one electrical conductor further comprises:

a first portion configured to engage and electrically communicate with an electrical device connector; and a second portion configured to engage the substrate.

7. The connector assembly of claim 6, wherein the second portion of the at least one electrical conductor comprises a conductor contact spring configured to maintain electrical communication between the pluggable connector and the substrate while the pluggable connector moves relative to the housing.

8. A circuit board assembly comprising:

a substrate comprising a printed circuit board; and a connector assembly comprising:

a housing configured to engage the substrate;

a pluggable connector comprising:

at least one electrical conductor configured to connect with a conductive contact pad of the substrate when the pluggable connector engages with the substrate;

wherein the pluggable connector is movable relative to the housing, wherein in an instance in which the housing is engaged with the substrate, the pluggable connector is configured to move relative to the substrate while maintaining electrical communication between the at least one electrical conductor and the substrate, and wherein one of the pluggable connector or the housing comprises one or more protrusions, and wherein the other of the pluggable connector and the housing comprises one or more slots configured to receive a corresponding one of the one or more protrusions.

9. The circuit board assembly of claim 8, wherein the substrate comprises a plurality of conductive contact pads comprising at least the conductive contact pad, and wherein the plurality of conductive contact pads are configured to maintain electrical communication between the pluggable connector and the substrate while the pluggable connector moves relative to the housing.

10. The circuit board assembly of claim 9, wherein the pluggable connector further comprises a plurality of electrical conductors, each electrical conductor of the plurality of electrical conductors having a first portion configured to engage and electrically communicate with an electrical device connector; and a second portion configured to engage and electrically communicate with the plurality of conductive contact pads of the substrate.

11. The circuit board assembly of claim 10, wherein in an instance in which the housing is engaged with the substrate, the plurality of conductive contact pads are disposed within the housing.

12. The circuit board assembly of claim 10, wherein the second portion of each electrical conductor of the plurality of electrical conductors comprises a conductor contact spring configured to maintain electrical communication between the pluggable connector and an associated conductive contact pad while the pluggable connector moves relative to the housing; and wherein the pluggable connector defines a bottom side configured to be disposed adjacent the substrate, a top side opposite the bottom side, and a plurality of lateral sides between the top side and the bottom side, the connector assembly further comprising two or more housing support springs positioned between two or more of the plurality of lateral sides of the pluggable connector and the housing.

13. An electronic device comprising:

a substrate; and a connector assembly comprising:

a housing configured to engage the substrate;

a pluggable connector comprising:

at least one electrical conductor configured to connect with a conductive contact pad of the substrate when the pluggable connector engages with the substrate;

wherein the pluggable connector is movable relative to the housing, wherein in an instance in which the housing is engaged with the substrate, the pluggable connector is configured to move relative to the substrate while maintaining electrical communication between the at least one electrical conductor and the substrate, and wherein one of the pluggable connector or the housing comprises one or more protrusions, and wherein the other of the pluggable connector and the housing comprises one or more slots configured to receive a corresponding one of the one or more protrusions.

14. The electronic device of claim 13, wherein the substrate comprises a plurality of conductive contact pads comprising at least the conductive contact pad, and wherein the plurality of conductive contact pads are configured to maintain electrical communication between the pluggable connector and the substrate while the pluggable connector moves relative to the housing, wherein the at least one electrical conductor further comprises:

a first portion configured to engage and electrically communicate with an electrical device connector; and a second portion configured to engage the substrate;

wherein the second portion of each electrical conductor of the at least one electrical conductor comprises a conductor contact spring configured to maintain electrical communication between the pluggable connector and an associated conductive contact pad while the pluggable connector moves relative to the housing; and wherein the pluggable connector defines a bottom side configured to be disposed adjacent the substrate, a top side opposite the bottom side, and a plurality of lateral sides between the top side and the bottom side, the connector assembly further comprising two or more housing support springs positioned between two or more of the plurality of lateral sides of the pluggable connector and the housing.

* * * * *